Oct. 10, 1939.  H. MALY  2,175,356
PLANTER
Filed April 23, 1937  4 Sheets-Sheet 1

Inventor
Henry Maly
By Clarence A. O'Brien
and Hyman Berman
Attorneys

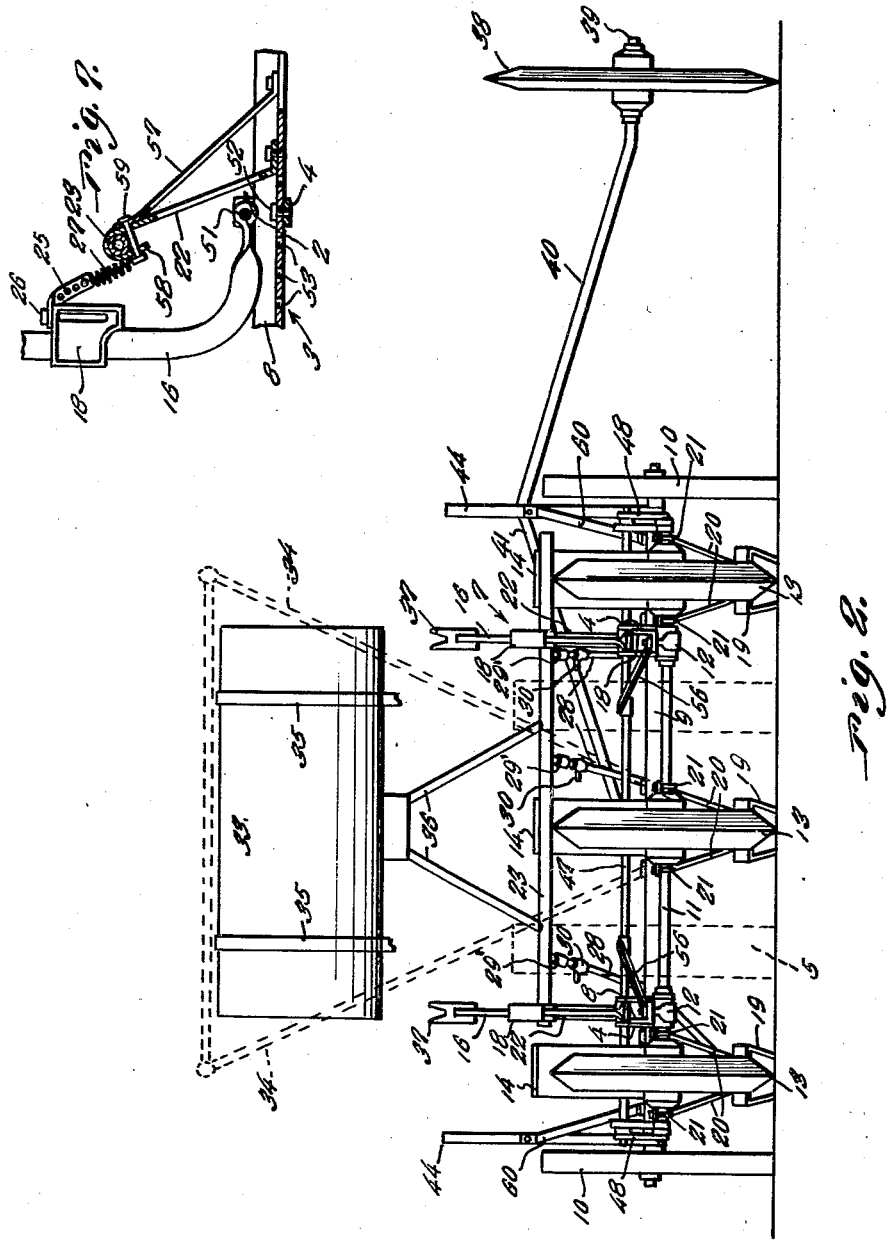

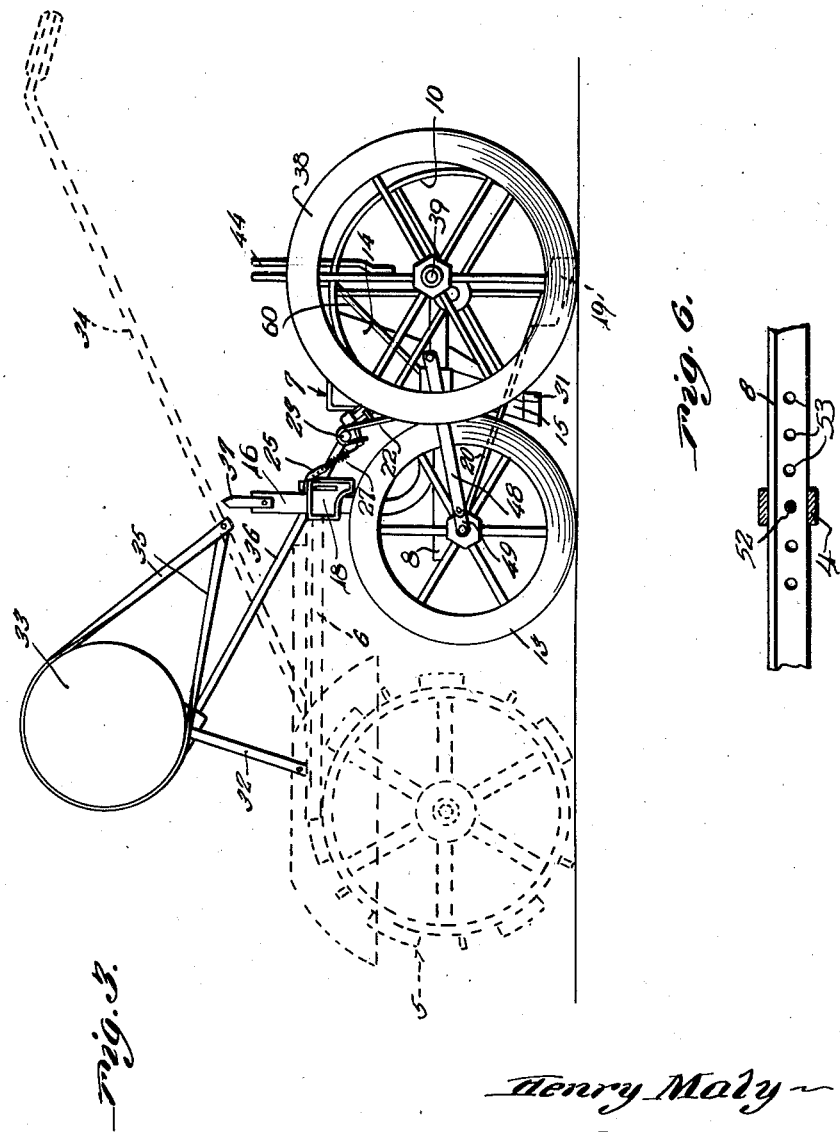

Oct. 10, 1939.  H. MALY  2,175,356
PLANTER
Filed April 23, 1937  4 Sheets—Sheet 4
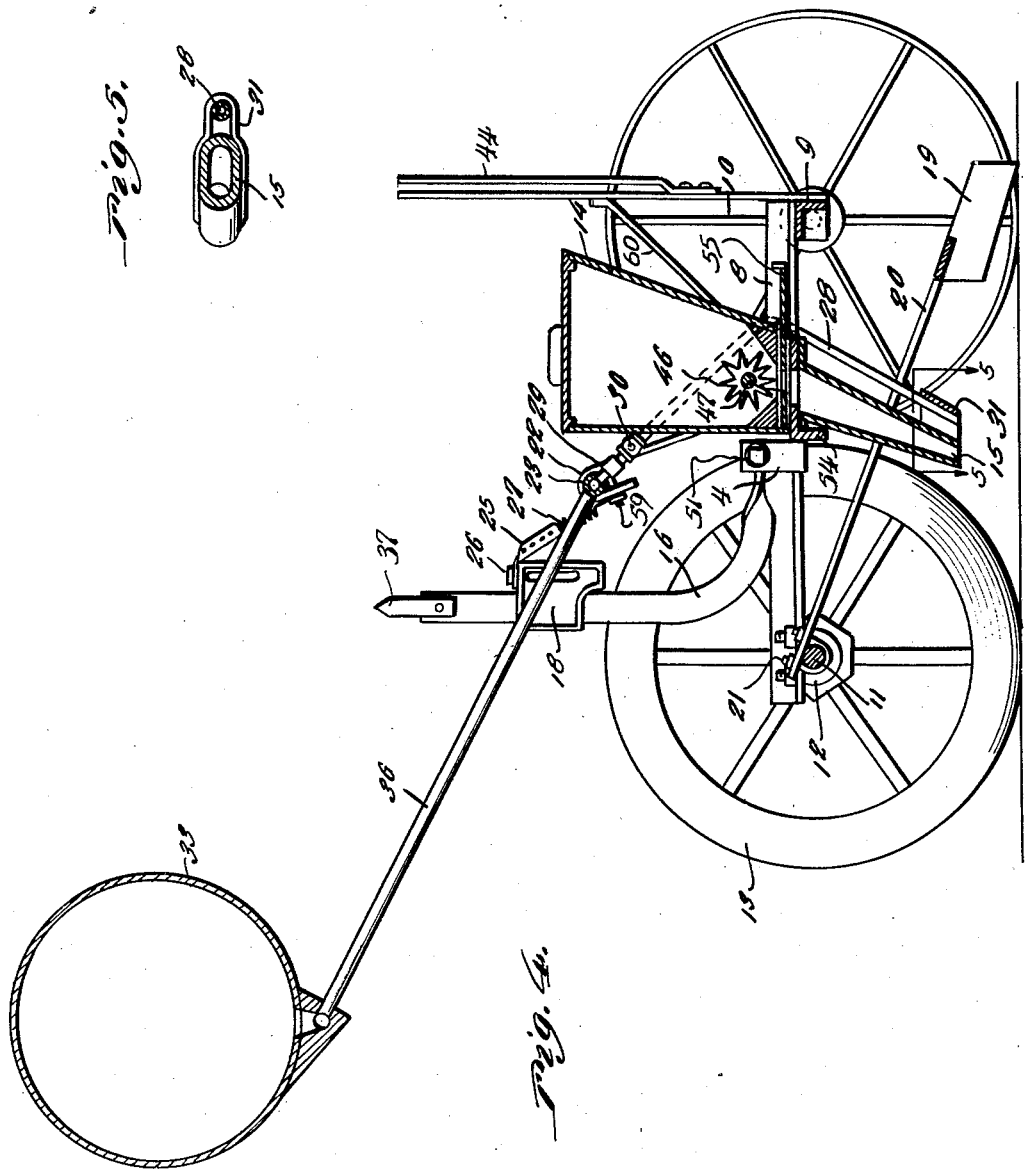
Inventor
Henry Maly
By Clarence A. O'Brien
Hyman Berman
Attorneys Patented Oct. 10, 1939

2,175,356

UNITED STATES PATENT OFFICE 2,175,356

PLANTER

Henry Maly, Goshen, N. Y.

Application April 23, 1937, Serial No. 138,643

1 Claim. (Cl. 111—52)

This invention pertains to new and useful improvements in planters and more particularly to a planter of the multiple row type.

The principal object of the present invention is to provide a planter wherein a fertilizing substance can be discharged into the furrows simultaneously with the seed.

Another important object of the invention is to provide a planter comprising a plurality of furrow wheels, together with novel means for regulating said furrow wheels.

Another important object of the invention is to provide a planter of the hand steered walking attendant type which has substantially all of the conveniences and attributes of a large size planter.

These and various other important objects and advantages of the invention will become apparent to the reader of the following specification.

In the drawings:

Figure 2 is a front elevational view.

Figure 3 is a side elevational view of the machine.

Figure 4 is a longitudinal sectional view through the machine.

Figure 5 is a cross sectional view on line 5—5 of Figure 4.

Figure 6 is a fragmentary sectional view disclosing adjusting means.

Figure 7 is a view in vertical longitudinal section through a portion of the machine, showing the means for rockably supporting the frame.

Figure 1:
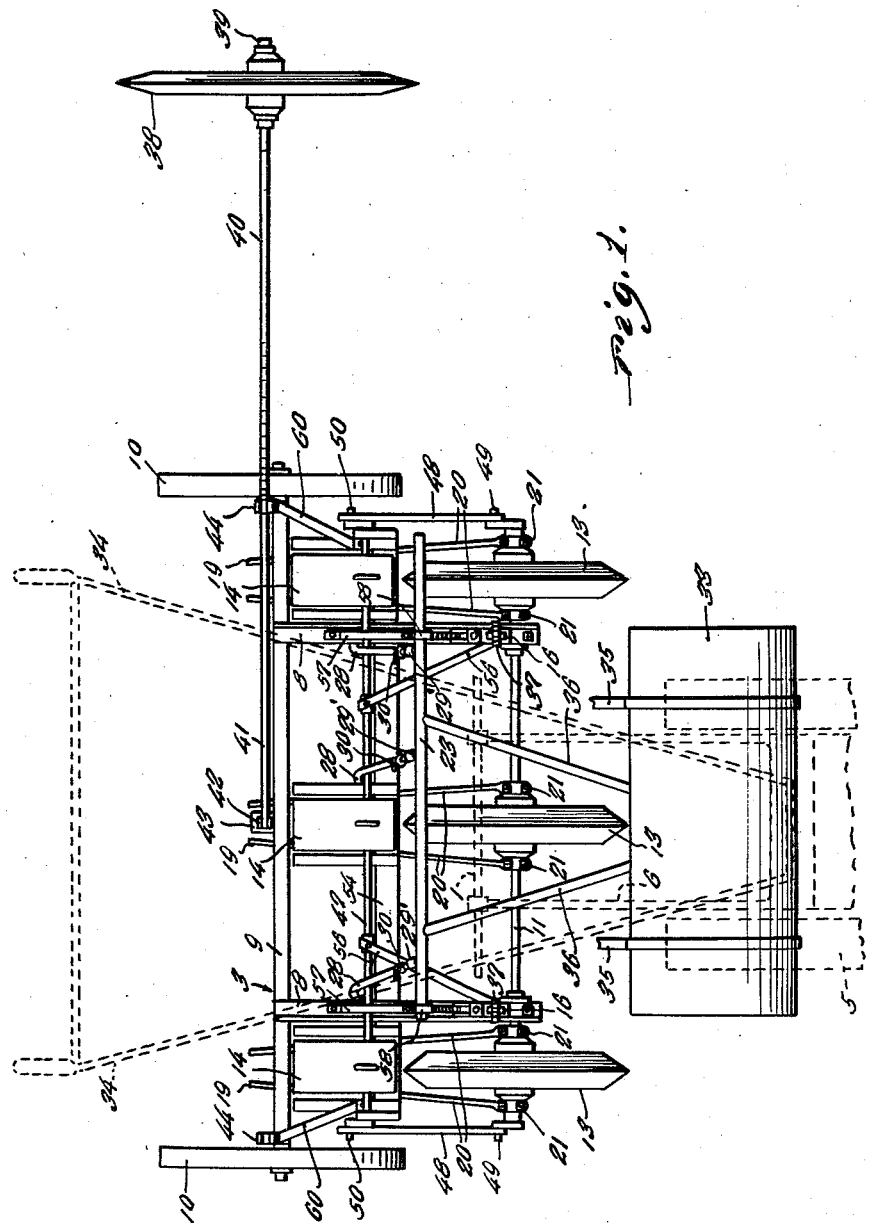
Figure 1 represents a top plan view of the machine.

Referring to the drawings wherein like numerals designate like parts, it can be seen that numeral 5 generally refers to a power unit in the nature of a small tractor of the two wheel type which is provided with a rearwardly extending frame 6, (see Figure 3). The usual horizontal bar 1 is mounted transversely on the rear end of the tractor frame 6. This bar 1 is shown in broken lines in Figure 1 of the drawings with the end portions thereof broken away.

The planter constituting the present invention is designated generally by the reference numeral 7 and comprises a pair of castings 18 of suitable metal which are mounted on the end portions of the bar 1. Mounted in the castings 18 are substantially L-shaped metallic hangers 16 which terminate in eyes 2 at their lower ends. This is shown to advantage in Figure 7 of the drawings.

Mounted for rocking movement in a vertical plane on the lower ends of the hangers 16 is a metallic frame which is designated generally by reference numeral 3. The frame 3 comprises a pair of longitudinal bars 8 and a transverse bar 9 on the rear ends of said bars 8. Ground wheels 10 are mounted on the outer ends of the bar 9. As also shown to advantage in Figure 7 of the drawings, the frame 3 is mounted on the hangers 16 by means including yokes 4 which slidably embrace the longitudinal bars 8 of said frame. Pins 51 are mounted in the upper portions of the yokes 4 and journaled in the eyes 2 of the hangers 16. It will thus be seen that the frame 3 is capable of rocking movement on the hangers 16. The yokes 4 are secured in position on the bars 8 of the frame 3 through the medium of bolts or screws 52. The elements 52 are engageable selectively in openings 53 which are provided therefor in the bars 8. Thus, the frame 3 may be moved forwardly or rearwardly on the hangers 16.

Mounted beneath the forward end portions of the frame bars 8 are U members 12 in which an axle 11 is journaled. Fixed at spaced points on the axle 11 are furrow-forming wheels 13. Mounted on the frame 3 in back of each furrow wheel 13 is a seed hopper 14. A transversely extending metallic bar 54 supports the seed hoppers 14. Discharge spouts or tubes 15 are provided for the hoppers 14. The discharge of the seed from the hoppers 14 is controlled by slides 55 in the bottoms of said hoppers.

Extending transversely through the lower portions of the hoppers 14 is a shaft 47. Braces 56 (see Figure 1) from the bars 8 are provided for the shaft 47 between the hoppers 14. Star wheels 46 are fixed on the shaft 47 for rotation in the lower portions of the hoppers 14. Cranks 50 are fixed on the end portions of the shaft 47. The reference numeral 49 designates similar cranks on the end portions of the axle 11. The cranks 49 and 50 are connected through the medium of connecting rods 48. It will thus be seen that the shaft 47 is driven by the furrow wheels 13 through the axle 11, etc.

Covering shoes 19 are provided behind the discharge spouts or tubes 15. Bars or rods 20 connect the covering shoes 19 to the axle 11. The forward end portions of the bars or rods 20 are loosely connected to the axle 11 through the medium of U bolts 21. This is best seen in Figure 4 of the drawings.

The reference numeral 33 designates a tank for the reception of a suitable liquid fertilizer which is mounted above the frame 6 of the tractor 5 on supports 32. The supporting structure for the tank 33 further includes braces 35 which extend to the handles 34 of the tractor 5. The reference numeral 36 designates a pair of flexible conduits having one end connected to the tank 33 and their other ends connected to a manifold 23 which is mounted transversely on the frame 3 forwardly of the hoppers 14. Referring again to Figure 7 of the drawings, it will be seen that the manifold 23 is supported by brackets 22 on the bars 8 of the frame 3. Braces 57 are provided for the brackets 22. The brackets 22 terminate in substantially U-shaped upper end portions 58 in which the manifold 23 is clamped through the medium of bolts 59. Straps 25 are secured on the castings 18 by bolts or the like 26. Coil springs 27 have one end secured by the bolts 59 to the upper portions of the brackets 22 and their other ends connected to the straps 25. The straps 25 are provided with a plurality of holes in which the coil springs 27 are selectively engageable, thus regulating the tension of said coil springs. Thus, the pressure of the furrow wheels 13 and the depth at which said wheels will function may be regulated as desired.

Discharge pipes 28 are connected at one end to the manifold 23. The pipes 28 are provided with regulating or control valves 30. As shown to advantage in Figure 4 of the drawings, the pipes 28 extend downwardly behind the discharge spouts or tubes 15 to the lower end portions of which they are connected by suitable straps or clamps 31. The pipes 28 further include unions 29'.

Rising from the end portions of the transverse bar 9 of the frame 3 are guides 44 which are provided with braces 60. The reference numeral 40 designates an arm which is selectively engageable in the guides 44 and adapted for vertical movement therein. The arm 40 includes an angularly extending inner portion 41 which is pivotally and swivelly connected, as at 42, to a lug or the like 43 which projects rearwardly from the transverse rear bar 9 of the frame 3. At its free end, the arm 40 terminates in an axle 39 on which a marker wheel 38 is journaled. The arm 40 is adapted to rest in either of a pair of forks 37 on the upper ends of the hangers 16 when the marker wheel 38 is not in use. In this manner the marker wheel 38 is supported in a raised out-of-the-way position.

It is thought that the operation of the device will be readily apparent from a consideration of the foregoing. As the machine is drawn over the ground by the tractor 5, said machine travels on the wheels 10 and the furrow wheels 13. Thus, the wheels 13 form furrows in the ground into which seed from the hoppers 14 and fertilizer from the tank 33 are dropped or deposited. The seed and fertilizer are then covered by the shoes 19. The rockable mounting of the frame 3 facilitates the travel of the machine over irregularities. Also, by adjusting the tension of the springs 27 and by shifting the frame 3 on the hangers 16 the pressure of the furrow wheels 13, and consequently the depth of the furrows formed thereby, may be regulated as desired. Of course, the tendency of the springs 27 is to lift the rear end of the frame 3 thereby exerting downward pressure on the furrow wheels 13. The marker wheel 38 may be conveniently swung around the rear of the machine for use on either side thereof and the arm 40 engaged in the guide 44 on that side. As hereinbefore stated, when the marker wheel 38 is not in use the arm 40 is engaged in one of the forks 37.

While the foregoing specification sets forth the invention in specific terms, it is to be understood that changes in the shape, size, and materials may be resorted to without departing from the spirit and scope of the invention as claimed hereinafter.

Having described the invention, what is claimed as new is:

In combination with a power unit of the hand-steered walking attendant type, a planter including a substantially U-shaped frame, ground engaging wheels for said frame at opposite sides of the latter and at the closed end of the U, said U-shaped frame having forwardly extending sides, an axle journaled on said sides at the open end of the U, furrow-forming wheels fixed on said axle, castings mounted on the frame of said power unit, substantially L-shaped hangers having vertical end portions extending through said castings, and substantially horizontal end portions clamped to the said forwardly extending side members of the planter frame, seed distributing means mounted on the planter frame, liquid fertilizer distributing means carried by the planter frame and adapted to feed liquid fertilizer in conjunction with the seed distributing means behind the furrow-forming wheels and into the furrows formed by said wheels, said seed distributing means including mechanism for controlling the discharge of seed therefrom, power transmission means operatively connecting said seed discharge mechanism with the aforementioned axle, a marker wheel supporting arm connected at one end thereof to said frame and adapted to be swung to a position on either side of said frame, a marker wheel on the free end of said arm, and means on each side of the frame for supporting said arm in either position.

HENRY MALY.